United States Patent [19]

Plavetich et al.

[11] Patent Number: 4,902,061
[45] Date of Patent: Feb. 20, 1990

[54] GLOVE BOX WITH CONVENIENCE TRAY

[75] Inventors: Richard G. Plavetich, Royal Oak; Roy F. Tiesler, Troy, both of Mich.

[73] Assignee: General Motors Corporation, Detroit, Mich.

[21] Appl. No.: 267,595

[22] Filed: Nov. 7, 1988

[51] Int. Cl.$^4$ .............................................. B62D 25/00
[52] U.S. Cl. ................................................. 296/37.12
[58] Field of Search ................ 296/37.12, 37.8, 37.13, 296/37.15; 224/281, 282, 42.43, 42.44

[56] References Cited

U.S. PATENT DOCUMENTS

| | | | |
|---|---|---|---|
| 2,301,730 | 11/1942 | Mann | 296/37 |
| 2,382,011 | 8/1945 | Howard | 296/37.12 X |
| 2,443,381 | 6/1948 | Farrar, Jr. | 296/37.12 X |
| 2,554,685 | 5/1951 | St. Denis | 108/45 |
| 2,592,032 | 4/1952 | Henderson | 108/45 |
| 2,789,861 | 4/1957 | Hudson | 296/37.12 |
| 2,820,687 | 1/1958 | Waring | 296/37.12 X |
| 3,386,765 | 6/1968 | Drach, Jr. | 296/37 |
| 3,503,648 | 3/1970 | James | 296/37.12 |
| 3,606,112 | 9/1971 | Cheshier | 224/42.44 |
| 3,606,447 | 9/1971 | Ryding | 296/37.12 |
| 3,899,982 | 8/1975 | Fetzek | 108/45 |
| 4,099,814 | 7/1978 | Hasselberger | 296/37 |
| 4,750,753 | 6/1988 | Dezern | 224/42.44 X |

FOREIGN PATENT DOCUMENTS 140280  8/1982  Japan ............................... 296/37.12

Primary Examiner—Margaret A. Focarino
Assistant Examiner—Joseph D. Pape
Attorney, Agent, or Firm—Charles E. Leahy

[57] ABSTRACT

According to the invention a vehicle instrument panel has an opening housing a glove box. A closure for the glove box is movably mounted on the instrument panel for movement between a closed position closing the opening and an open position moved rearwardly away from the instrument panel to provide access into the glove box. A tray is mounted on the instrument panel by a sliding or telescoping mechanism permitting tray movement between a retracted position concealed behind the closure and an extended position in which the tray is cantilevered rearwardly from the instrument panel to accept beverage containers or other articles at the discretion of the occupant. The closure and the tray are configured to engage with one another when the tray is in the fully open position so that the closure will support the cantilevered tray. The tray must be comprised of a plurality of telescopically connected tray portions.

5 Claims, 1 Drawing Sheet

GLOVE BOX WITH CONVENIENCE TRAY

The invention relates to a glove box for a motor vehicle and more particularly provides a convenience tray which telescopes rearwardly from the instrument panel and is supported by the glove box cover.

BACKGROUND OF THE INVENTION

It is well known in motor vehicles to provide an instrument panel forwardly of the front seat occupants. Commonly, the vehicle operating controls and instruments are positioned on this instrument panel. A glove box for storing gloves, maps, etc., is also provided on the instrument panel. Glove boxes typically include an opening in the instrument panel. The glove box may be fixed in the instrument panel and accessible through the opening. A glove box door is pivoted on the instrument panel and has a closed position closing the opening and presenting a generally flush relationship with the instrument panel. In other vehicles the glove box may be in the form of a drawer which pulls rearwardly out of the opening in the instrument panel. The drawer has the closure panel mounted thereon.

The present invention relates to a convenience tray which stores in a recess in the instrument panel generally at the top edge of the glove box opening and is extended rearwardly independently of the glove box closure panel to provide a tray for supporting beverages, maps, etc.

SUMMARY OF THE INVENTION

According to the invention a vehicle instrument panel has an opening housing a glove box. A closure for the glove box is movably mounted on the instrument panel for movement between a closed position closing the opening and an open position moved rearwardly away from the instrument panel to provide access into the glove box. A tray is mounted on the instrument panel by a sliding or telescoping mechanism permitting tray movement between a retracted position concealed behind the closure and an extended position in which the tray is cantilevered rearwardly from the instrument panel to accept beverage containers or other articles at the discretion of the occupant. The closure and the tray are configured to engage with one another when the tray is in the fully open position so that the closure will support the cantilevered tray. The tray may be comprised of a plurality of telescopically connected tray portions.

DESCRIPTION OF THE PREFERRED EMBODIMENT

Figure 1:
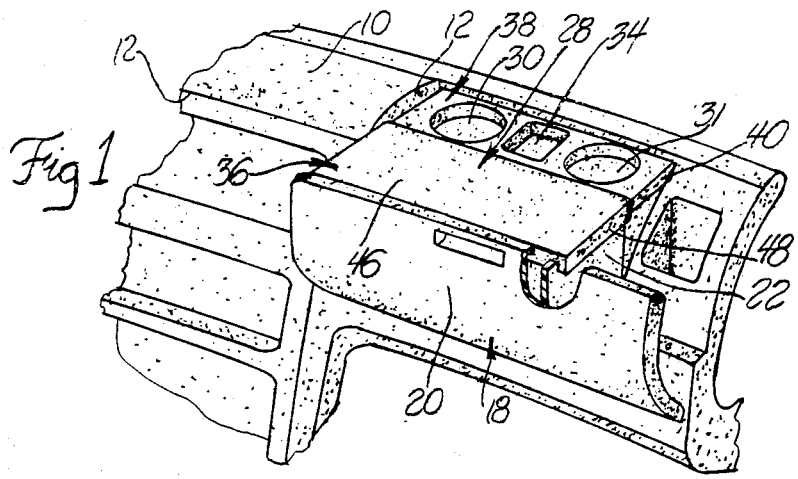
FIG. 1 is a perspective view of a vehicle body instrument panel having the closure open and the tray extended rearwardly.
Figure 2:
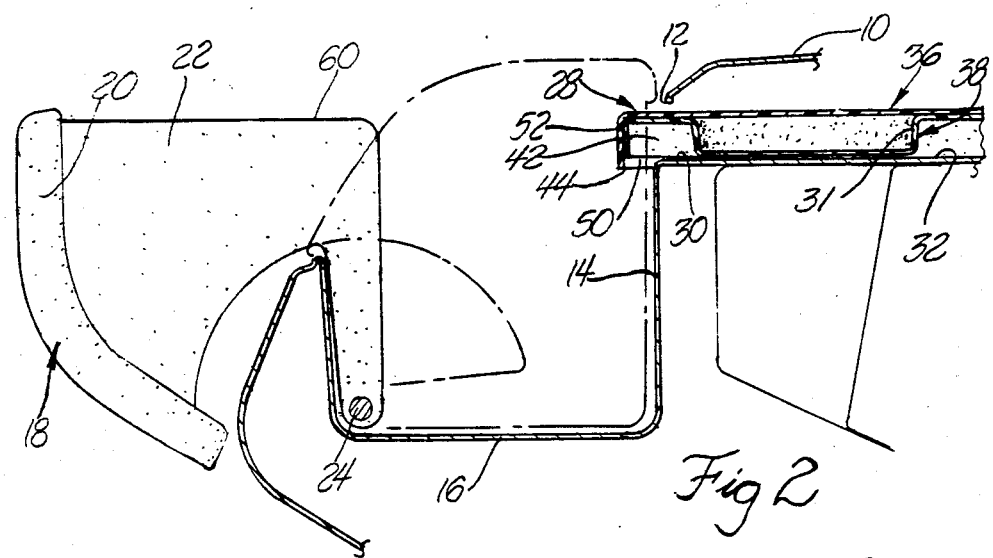
FIG. 2 is a side elevation view showing the closure pivoted to the open position and the tray in its retracted position stored in the instrument panel to permit unobstructed access to the glove box compartment.

Referring to FIG. 1, there is shown a vehicle body instrument panel 10. The instrument panel has an opening 12 in which a glove box 14 is situated. As best seen in FIG. 2, the glove box 14 is provided by a bin 16 having an open top defined by opening 12 through which gloves, maps, or other articles, may be placed into or removed from the bin 16. A closure 18 is provided for closing the opening 12 in the instrument panel 10. As best seen in FIG. 2, the closure 18 is preferably of molded plastic and includes a closure panel 20, an integral right hand wall 22 provided generally adjacent the right hand end of the closure panel 20, and a left hand wall 23 provided at the left hand end of the closure panel 20. The end walls of the closure 18 reach down into the bin 16 and are pivotally mounted therein by a pivot shaft 24. The pivot shaft mounts the closure 18 for pivotal movement between the solid line indicated open position of FIG. 2 and a phantom line closed position of FIG. 2. The phantom line position shows that the closure panel 20 assumes a closed position in which the closure panel 20 assumes a generally flush relationship with the surface of the instrument panel 10.

As best seen in FIG. 1, a convenience tray generally indicated at 28 is mounted in the instrument panel and pulls rearwardly over the top of the glove box 14 and closure 18 to provide a convenient location for holding beverage cups, maps, or other articles at the convenience of the passenger. Accordingly as seen in FIG. 1, the convenience tray 28 may have cup retaining recesses 30 and 31 which are circular, and also a rectangular recess 34 for coins or other articles to be retained.

Figure 3:
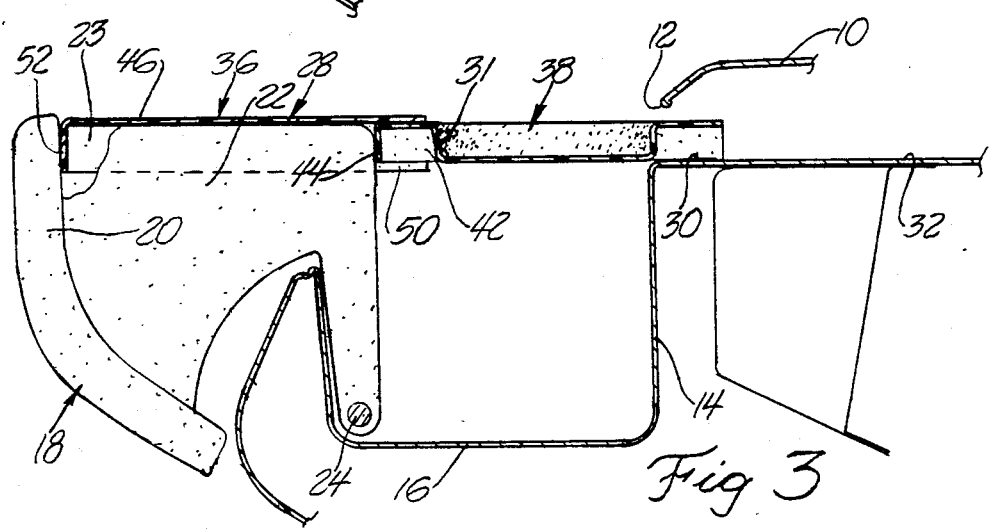
FIG. 3 is a side elevation view corresponding to FIG. 1 in which the closure is open and the tray fully extended rearwardly and supported by the closure.

As best seen in FIG. 2, the convenience tray 28 is stored within a tray opening 30. The tray opening 30 is adjacent and just below the top edge of the instrument panel opening 12 and at the top of the bin 14. The bottom wall 32 of the tray opening 30 is preferably a planar sheet of plastic or metal material which may be integral with the bin 16 or a separate part. The tray opening 30 also has side walls and a top wall thereof is defined by the instrument panel 10. The convenience tray 28 may be a single sheet of molded plastic which stores within the tray opening 30 and slides forwardly and rearwardly on the bottom wall 32. However, such a one piece tray requires the tray opening 30 and bottom wall 32 thereof to have a very substantial depth to receive the entire length of such a one piece convenience tray 28. Accordingly, as best seen in FIGS. 2 and 3, the convenience tray 28 of this preferred embodiment is provided by an outer tray panel 36 and an inner tray panel 38. The inner tray panel 38 is a plastic molding having downturned flanges 40 on the righthand side thereof as shown in FIG. 1 and 42 on the lefthand side thereof as shown in FIG. 3. Inner tray panel 38 also has a front flange 44.

The outer tray panel 36 is also molded plastic and has a generally planar top wall 46, a downturned righthand flange 48 shown in FIG. 1 and a downturned flange 50 on the left side thereof as shown in FIG. 2. In addition, a downturned front flange 52 extends across the front of the outer tray panel 36. In addition, the rearward end of the outer tray panel 36 has an integrally molded cross member 50 which reaches between the side flanges 42 add 44 and cooperates with the planar panel 46 and the flanges 48 and 50 in encircling the inner tray panel 38 in a manner by which the outer tray 36 and the inner tray panel 38 are telescopically connected for sliding movement relative to each other.

Accordingly, it will be understood that the outer tray panel 36 and the inner tray panel 38 are telescopically inter-related for sliding movement relative to one another as will be appreciated by comparing the fully retracted position of FIG. 2 and the fully extended position of FIG. 3. Furthermore, the tray opening 30 and bottom wall 32 define a track mounting the inner tray for sliding movement relative the instrument panel 18.

As seen in FIG. 2, the end wall 22 of closure 18 has a top edge 60 which is generally aligned with the planar portion 46 of the outer tray panel 36. Accordingly, as seen in comparing FIGS. 2 and 3, the rearward sliding movement of the outer tray panel 36 to the fully rearward position of FIG. 3 causes the outer tray panel 36 to engage with the upper edge 60 of the side wall 22 so that the outer tray panel 36 is supported by the right hand wall 22 and the left hand wall 23. It will be appreciated that the front flange 52 of the outer tray panel 36 has a cutout therein to slide over the end wall 22. A similar cutout in the front flange 52 fits over the left hand wall 23 of the closure 18.

Referring to FIG. 2, it is seen that the convenience tray 28 is fully retracted into the stored position of the instrument panel 10. The outer tray panel 36 overlies and encircles the inner panel 38. When the occupant wishes to deploy the convenience tray 28, the front flange 52 is gripped, as a handle, to pull the outer tray panel 36 rearwardly. During the progressive rearward sliding movement of the outer tray panel 36, the outer tray panel 36 bridges across the bin 16 and reaches the walls 22 and 23 of the closure 18 so that the leading portion of the outer tray panel 36 becomes supported by its contact with the upper edge 60 of the end wall 22. As this rearward movement progresses, the cross member 50 of the outer tray panel 36 engages with the front flange 44 of the inner tray panel 38 so that the continuing rearward movement of the outer tray panel 36 tows the inner tray panel 38 rearwardly to its position of FIG. 3. Accordingly, as seen in FIG. 3, the outer tray panel 36 is supported by the upper edge wall 60 of wall 22 and the upper edge of the wall 23 of the closure 18, while the inner tray panel 38 is supported at its forward end by the cross member 50 of the outer tray panel 36 and the other end of the tray panel 38 is supported by its continuing engagement with the bottom wall 32 of the tray opening 30 of the instrument panel 10.

The convenience tray 28 is returned to its closed position by pushing the outer tray 36 forwardly to the stored position within the tray opening 30. As the outer tray panel 36 is progressively closed, its front flange 52 engages with the front flange 44 of inner tray panel 38 to also push the inner tray panel 38 forwardly to the closed position. When the convenience tray 28 is fully retracted, the closure 18 may be pivoted forwardly to the closed phantom line indicated position of FIG. 2.

Thus it is seen that the invention provides a new and improved glove box with convenience tray in which the convenience tray is stored within the glove box opening of the instrument panel and telescopes rearwardly to overlie the glove compartment opening and is supported by the glove box closure panel in the open position of the tray.

The embodiments of the invention in which an exclusive property or privilege is claimed are defined as follows:

1. A glove box apparatus housed in an opening of a motor vehicle instrument panel comprising:
    a closure;
    means movably mounting the closure on the instrument panel for movement between a closed position closing the opening and presenting a generally flush relationship with the instrument panel, and an open position moved rearwardly and away from the instrument panel;
    a tray;
    means slidably mounting the tray on the instrument panel for movement between a retracted position in which the tray is concealed behind the closure and an extended position in which the tray is cantilevered rearwardly from the instrument panel;
    and support means carried respectively by the closure and the tray, said support means being engageable with one another upon rearward sliding movement of the tray so that the closure supports the tray in the extended position.

2. The combination of claim 1 in which the closure is pivotally mounted on the instrument panel and pivots rearwardly to the open position, and the support means carried by the closure is moved into a supporting position when the closure is pivoted to the open position in readiness to support the tray when the tray is extended.

3. The combination of claim 1 in which the tray is comprised of a plurality of tray portions telescopably interrelated and extendable rearwardly to the open position and at least the rearward most of the tray positions has support means engageable with the support means of the closure.

4. A glove box apparatus housed in an opening of a motor vehicle instrument panel comprising:
    a closure;
    means movably mounting the closure on the instrument panel for movement between a closed position closing the opening and presenting a generally flush relationship with the instrument panel, and an open position moved rearwardly and away from the instrument panel;
    a tray;
    track means slidably mounting the tray on the instrument panel within the opening for movement between a retracted position in which the tray is concealed behind the closure and an extended position in which the tray is cantilevered rearwardly from the instrument panel;
    and support means carried by the closure and movable therewith upon opening movement of the closure to assume a position in alignment with the path of the tray movement from the concealed position to the extended position so that the tray engages the support means and becomes supported in its cantilevered position by the closure.

5. A glove box apparatus housed in an opening of a motor vehicle instrument panel comprising:
    a closure panel adapted to fit the opening and present a generally flush relationship with the instrument panel;
    pivot means movably mounting the closure on the instrument panel for movement between a closed position closing the opening and, and an open position moved rearwardly and away from the instrument panel;
    a tray having a plurality of tray portions telescopably interrelated for extension and collapse relative to one another;
    means mounting the tray on the instrument panel within the opening so that the tray is movable between a retracted position in which the tray is concealed behind the closure and an extended position in which the tray is cantilevered rearwardly from the instrument panel;

and said closure having wall portions thereof movable therewith upon pivoting movement of the closure to the open position to assume a position in alignment with the path of the tray movement from the concealed position to the extended position so that the tray engages the wall portions of the closure and the tray is supported in its cantilevered position by the closure.

* * * * *